June 14, 1966  A. C. MAMO  3,255,835
GROUND EFFECT VEHICLE WITH LIFT SUPPLEMENTING AIRFOILS
Filed May 31, 1963
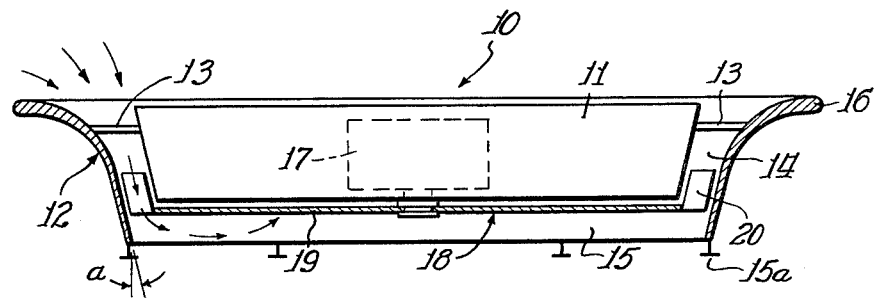
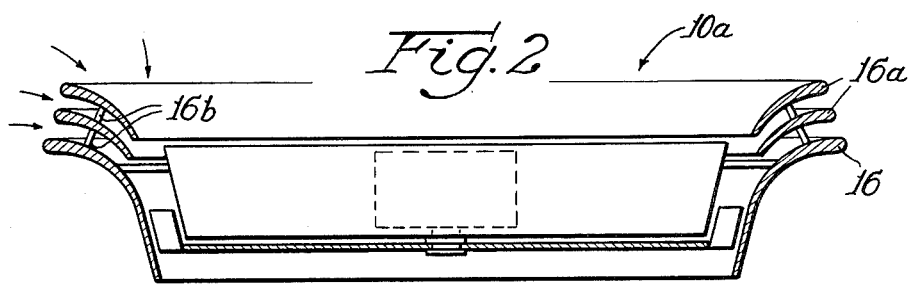
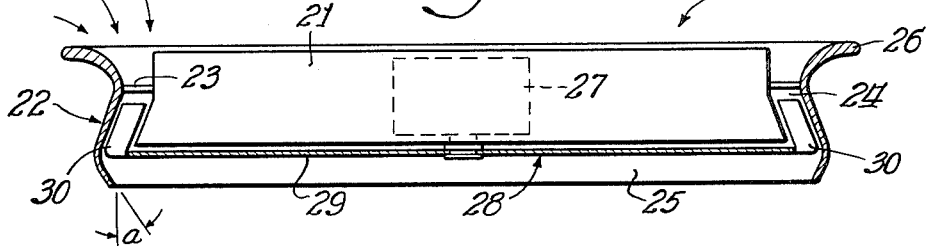
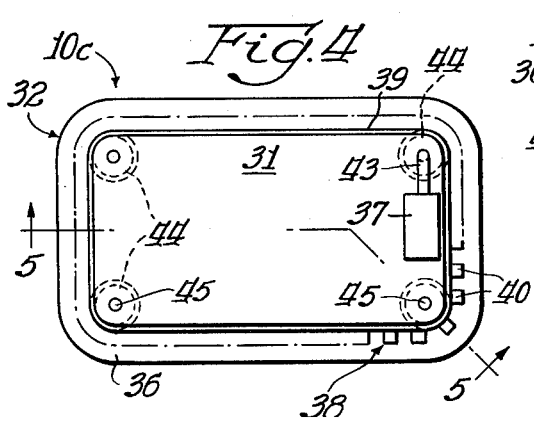
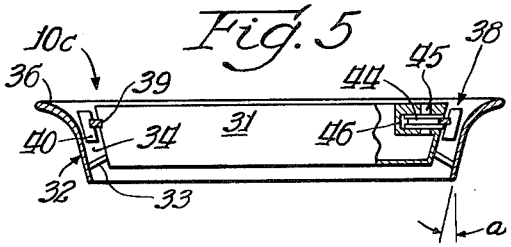
Inventor:
Anthony C. Mamo
By: Evan D. Roberts Atty United States Patent Office 3,255,835
Patented June 14, 1966

3,255,835
GROUND EFFECT VEHICLE WITH LIFT
SUPPLEMENTING AIRFOILS
Anthony C. Mamo, Des Plaines, Ill., assignor to Borg-Warner Corporation, Chicago, Ill., a corporation of Illinois
Filed May 31, 1963, Ser. No. 284,668
1 Claim. (Cl. 180—7)

This invention relates to a ground effect vehicle and in particular to a vehicle having an air foil used in conjunction with a pressurized air mass for providing support for the vehicle.

Known types of ground effect vehicles obtain support by providing a volume of pressurized air between it and the supporting surface thereof. This is the sole source of support for the known types of ground effect vehicles and is accomplished by using an aircraft type propeller rotating about a vertical axis within a vertical shroud. Typically, the fan draws a cylindrical column of air from the top of the vehicle and directs it downwardly beneath the chamber in the vehicle to create an air mass supporting the vehicle on the supporting surface. Any fan, and in particular, a radial bladed fan has a tendency to direct an amount of air radially instead of axially and thereby diminishing the amount of air directed vertically within the chamber. It is well known in the use of fans to provide a shroud around the fan to reduce the end spillage and deflect the radially directed air into a path parallel with the axis of the rotation of the fan to provide the greatest possible volume of air passing in the vertical direction. Under these conditions in the known types of vehicles considerable power is required to provide the necessary high pressure air mass in the chamber to lift and support the vehicle on the supporting surface. It is, therefore, highly desirable to provide an additional lifting means without necessarily increasing the volume of air flow or the power required for driving the fan.

An object of this invention is to provide a ground effect vehicle which is more efficient and which has a relatively simple and economical construction and which provides more cargo space for a given size craft.

The general object of this invention is to provide a ground effect vehicle adapted to utilize an airfoil for supplementing the force exerted by the supporting high pressure air mass.

A particular object of this invention is to provide a ground effect vehicle having peripherally located fan blades effective to an annular peripheral duct providing localized air entry of high velocity air into and through the vehicle to an open chamber beneath the vehicle for providing a pressurized air mass to partially support the vehicle and high velocity air moving over an airfoil structure in the path of the incoming air to augment the support provided by the supporting mass of air in the chamber.

FIG. 1 is a vertical sectional view of the vehicle showing the airfoil, duct and peripheral fan.

FIG. 2 is a vertical sectional view of one embodiment of the vehicle showing a fan and duct modification of the invention.

FIG. 3 is a vertical section view of one embodiment of the vehicle showing an airfoil modification of the invention.

FIG. 4 is a top plan view of a non-circular embodiment of the invention.

FIG. 5 is a sectional view taken along line 5—5 of FIG. 4 showing the supporting and driving means for the fan blades of the embodiment of this invention shown in FIG. 4.

Referring to the drawings there is illustrated (FIG. 1) an exemplary embodiment of applicant's ground effect vehicle, generally designated by the numeral 10, which includes an annular first or inner body 11 having a concentric second shell or outer body 12 rigidly secured thereto by brackets 13. The shell 12 is spaced from the body so as to form an annular duct 14 and a downwardly opening chamber 15. An annular airfoil 16 is provided on the top of the shell 12 and the bottom of the shell is inclined an an angle $a$ which is from 10 to 60 percent from vertical. A motor 17 is mounted in the body 11 and is adapted to rotate a peripheral fan support 18 in the upper portion of the chamber 15. The fan support 18 includes a hub 19 which has fan blades 20 on the periphery thereof and which are operable within the duct 14.

It should be noted that the fan 18 constitutes a peripheral fan instead of a full-bladed fan as has heretofore been used for ground effect vehicles. This peripheral fan provides a localized extremely high velocity air stream through the duct 14 so that the velocity of the air entering the duct 14 will likewise be high and concentrated to provide an airfoil lifting effect by virtue of a high velocity low pressure above the foil and a lower velocity higher pressure below the foil as it passes over the air foil. It should further be noted that this invention provides an airfoil in the path of the incoming air which tends to deflect the air from a horizontal path to a downward path and in so doing the airfoil redirects the kinetic energy from the incoming air as the direction of the incoming air is changed from the horizontal to the downward direction. Thus, a lifting force is provided for the vehicle in addition to the air pressure airfoil effect mentioned above.

In operation, the motor is actuated so that the peripheral fan will be driven to draw air downwardly through the duct 14 at a very high velocity. The air will follow the path shown by the arrows (FIG. 1) and results in the formation of a high pressure air mass in the chamber 15. This air mass will be increased and will eventually react against the vehicle 10 to force the vehicle off of the ground whereupon air will tend to escape from beneath the vehicle through a space provided by support struts 15a. The motor is of sufficient horsepower so that the fan will provide air for the air chamber at a high velocity and in a greater quantity than it is lost from beneath the vehicle so as to maintain a pressurized air mass in the chamber 15 for the purpose of supporting the vehicle above the ground. Also, the inward inclination $a$ directs the air inwardly around the periphery so as to tend to retain the air within the chamber 15.

Simultaneously with the support provided by the high pressure air mass in the chamber 15, the high velocity of the incoming air, adjacent the top of the airfoil 16, will cause a partial vacuum above the airfoil. The atmospheric pressure beneath the airfoil will exert an upward force on the airfoil 16 to tend to lift the vehicle and thus augment the high pressure supporting air mass in the chamber 15.

Thus, this invention provides a ground effect vehicle having a peripheral fan 18 combined with a downwardly opening chamber 15 and an airfoil 16. The fan supplies the chamber 15 with a mass of high pressure air and subjects the airfoil 16 to a high velocity stream of air to provide an aggregate lifting force resulting from the combined effects of a high pressure air mass beneath the vehicle and a pressure differential adjacent the airfoil 16.

A further embodiment of this invention is illustrated in FIG. 2 and includes a vehicle 10a as illustrated in FIG. 1 with annular airfoils 16a supported by brackets 16b on the annular airfoil 16. The airfoils 16a react with the high velocity air to provide additional lifting force to the force provided by foil 16. The principle of operation of the modified vehicle 10a (FIG. 2) is otherwise like that of vehicle 10 (FIG. 1). Although the airfoils 16a are shown rigidly secured to each other or to the outer body 12, it should be noted that the airfoils 16a can be secured to either or both of the first or second bodies 11 and 12 with the same results inasmuch as the body 12 is rigidly secured to body 11 by the brackets 13.

Another embodiment of this invention is illustrated in FIG. 3 and includes a ground effect vehicle, generally designated by the numeral 10b, which is similar to the vehicle shown and described in reference to FIG. 1. This embodiment includes a body 21 having a concentric body or shell 22 secured by brackets 23. The shell 22 is spaced from the body 21 so as to define an S-shaped annular duct 24 and a downwardly opening chamber 25. An annularly located airfoil 26 is provided on the upper portion of the shell 22, and the bottom of the shell 22 is inclined by the angle $a$ as previously defined.

A motor 27 is secured to the body 21 and is adapted to rotate a peripheral fan 28 in the upper portion of the chamber 25. The fan 28 includes a hub 29 which has fan blades 30 on the periphery thereof and which are operable within the duct 24. It should be noted that the fan blade portion of the duct 24 and the fan blades 30 are directed somewhat outwardly. This provides a more efficient fan due to the centrifugal characteristics of a fan which is ducted in this general way. The principal operation of the ground effect vehicle 10b (FIG. 3) is otherwise like that of the vehicles 10 and 10a (FIGS. 1 and 2).

Another embodiment of this invention is illustrated in FIGS. 4 and 5 and shows that this invention is not limited to a circular configuration, but could take many other forms, such as triangular, rectangular or other polygonal configuration. This embodiment includes a ground effect vehicle generally designated by the numeral 10c which can be readily seen to incorporate the inventive concepts of the embodiments of the invention as illustrated in FIGS. 1–3.

The embodiment 10c includes a body 31 having a body or shell 32 spaced therefrom and secured thereto by brackets 33. The body 32 forms a passage 34 around the body 31. An airfoil 36 is provided on the upper portion of the body 32 and the bottom of the body is inclined at an angle $a$ as previously defined with respect to the invention as shown in FIGS. 1–3. A motor 37 is secured to the body 31 and is adapted by drive train 43 to drive the adjacent element 44 of elements 44 which are sprockets, pulleys or similar elements mounted on shafts 45 in recesses 46 of the body 31.

A fan 38 is provided, which includes a continuous belt or chain, etc. 39 adapted to engage the elements 44 which will be pulleys or sprockets, etc., to appropriately accommodate the member 39. Fan blades 40 are secured to the element 39 and are adapted to draw air through the passage 34 when the motor 37 is actuated to cause the adjacent element 44 to drive the fan 38 on the elements 44 in the passage 34. The airfoil 36 reacts with the incoming air as described with respect to the airfoils 16 and 26 (FIGS. 2 and 3) and can be effective with more than one airfoil such as 16a (FIG. 2) to provide supplemental lift for the vehicle 10c.

While I have described my invention in connection with certain specific constructions and arrangements, it is to be understood that this is by way of illustration and not by way of limitation and the scope of my invention is defined solely by the appended claim which should be construed as broadly as the prior art will permit.

What is claimed is:

In a ground effect vehicle comprising the combination of a first body, an outer body secured to said first body defining a downwardly opening chamber beneath the vehicle and an annular duct between said first and second bodies adjacent the periphery of the vehicle and having an inlet at the upper part of the vehicle and an outlet slanted inwardly and downwardly in the chamber, a peripheral fan adapted to draw air through the duct into the chamber at high velocity, and an airfoil secured to said second body in the path of the high velocity air stream created by the peripheral fan for reacting with the air to provide a lifting force on the vehicle, and one or more airfoils secured to said vehicle and spaced from said second body airfoil in the path of the incoming air for reacting with the air to provide an additional lifting force on the vehicle.

References Cited by the Examiner

UNITED STATES PATENTS

| | | | |
|---|---|---|---|
| 1,833,722 | 11/1931 | Prokop | 244—67 |
| 3,034,747 | 5/1962 | Lent | 244—73X |
| 3,054,578 | 9/1962 | Brocard | 244—73 |

FOREIGN PATENTS

| | | |
|---|---|---|
| 975 | 1914 | Great Britain. |
| 895,057 | 4/1962 | Great Britain. |
| 944,886 | 12/1963 | Great Britain. |

A. HARRY LEVY, *Primary Examiner.*

MILTON BUCHLER, *Examiner.*

M. A. KLEIN, *Assistant Examiner.*